July 10, 1962     A. K. HEAD     3,043,112
METHOD AND MEANS FOR PRODUCING REFRIGERATION BY SELECTIVE RADIATION
Filed Jan. 12, 1960

INVENTOR.
Alan K. Head
BY
Oliver W. Hayes

United States Patent Office 3,043,112
Patented July 10, 1962

3,043,112
METHOD AND MEANS FOR PRODUCING REFRIGERATION BY SELECTIVE RADIATION
Alan K. Head, Toorak, Victoria, Australia, assignor to Commonwealth Scientific and Industrial Research Organization, Victoria, East Melbourne, Australia, a body corporate of Australia
Filed Jan. 12, 1960, Ser. No. 2,041
Claims priority, application Australia Feb. 9, 1959
15 Claims. (Cl. 62—56)

This invention relates to refrigeration and more particularly to devices for producing refrigeration.

It is common practice to effect refrigeration by expansion or absorption of gases and vapors, and use has also been made of chemical and electro-magnetic means of cooling. However, all of these means require the supply of energy whether mechanically, as heat, or in some other form.

Accordingly, it is a principal object of this invention to provide a simpler method and means by which the natural heat loss by radiation can be made greater than the total heat gain by radiation, conduction and convection thereby resulting in a net loss of heat and consequent lowering of temperature.

Another object of the invention is to provide a method and apparatus for producing temperatures below ambient without utilizing a source of power.

The method of this invention requires no supply of energy, heat abstracted from the refrigerated substance being radiated to outer space or to clouds in the sky if they are present.

As clouds have an ambient temperature, it is accordingly a further object of the invention to provide means to refrigerate a surface to the temperature of the clouds present at the time.

Other objects of the invention will in part be obvious and will in part appear hereinafter.

The invention accordingly comprises the product possessing the features, properties, and the relation of components and the process involving the several steps and the relation and order of one or more of such steps with respect to each of the others which are exemplified in the following detailed disclosure and the scope of the application of which will be indicated in the claims.

Figure 1:
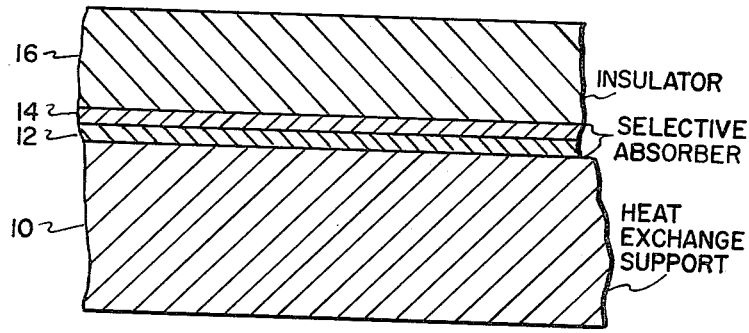
Figure 2:
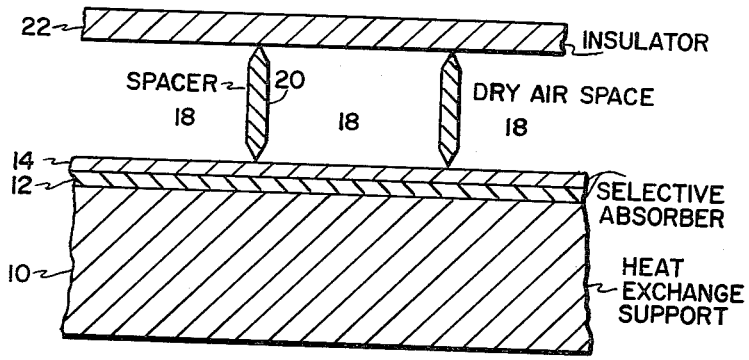
Figure 3:
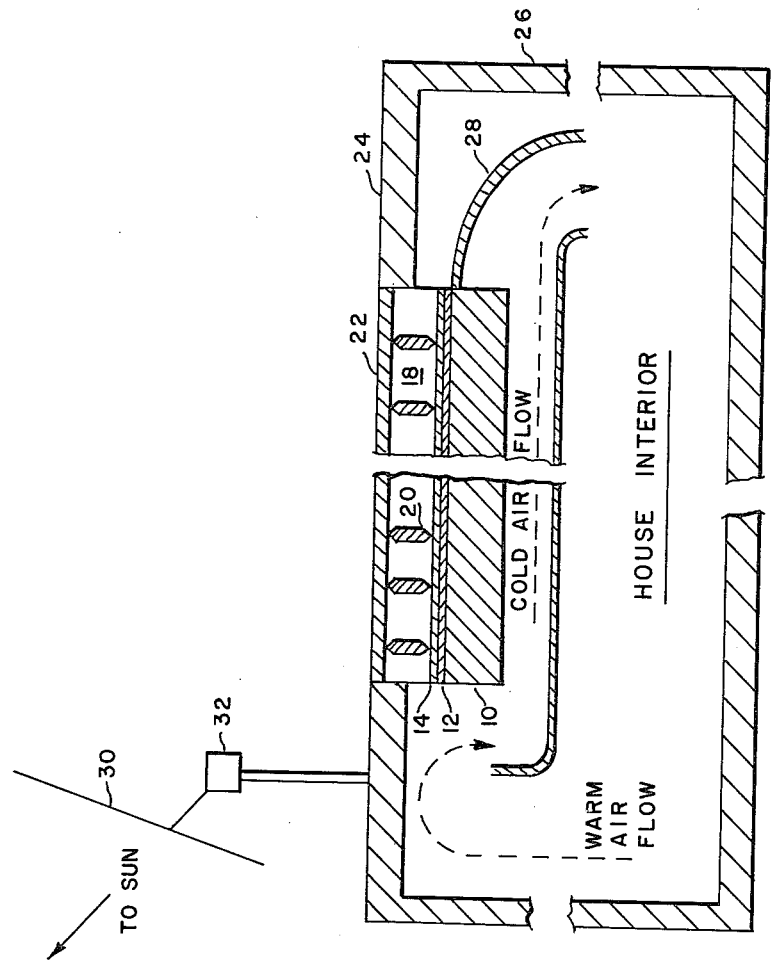

For a fuller understanding of the nature and objects of the invention, reference should be had to the following detailed description taken in connection with the accompanying drawings wherein FIGURE 1 is a sectional schematic illustration of the invention, FIGURE 2 is a sectional schematic illustration of an alternate form of the invention; and FIGURE 3 is a diagrammatic, schematic illustration of the use of the invention for cooling a house.

In the following description, radiation is specified by its wave lengths in microns, one micron being a thousandth part of a millimetre.

According to this invention, a method for producing temperatures below ambient consists in arranging a layer of material which emits or absorbs radiation within the range of about 8 to 13 microns, in contact with a surface which is relatively reflective to radiation outside this range. The selective absorber so produced, and hereinafter called the selective absorber for the purposes of the specification and claims can radiate more energy to the sky than it absorbs from the atmosphere and other sources whereby temperature of the selective absorber is caused to fall below ambient. Normally these conditions are met by setting up the selective absorber in a position where it can emit radiation to the sky and covering it with a layer of material which is a poor thermal conductor but which is substantially transparent to all wave lengths of light incident thereon.

According to a further feature of the invention the refrigerating means comprises a selective absorber, as referred to above, arranged in heat exchange relation with a body to be cooled and positioned so that it can radiate to the sky.

In one preferred embodiment of the invention, the refrigeration device of the present invention is preferably formed by coating a heat exchange support 10 with a highly reflective layer 12 of silver, gold, aluminum or other suitable metal, and applying on top of this highly reflective layer a thin layer 14 of a substance which is transparent to all wave lengths except between 8 and 13 microns where it absorbs strongly. If desired, the heat exchange support 10 and the reflective layer 12 may, for example, be provided for by a single highly polished metal being substantially reflective outside the 8 to 13 microns range. The combination of the reflective surface and the layer of high absorption in the 8 to 13 micron range thus forms the "selective absorber." To prevent conductive and convective transfer of ambient heat to the selective absorber an insulating layer, schematically indicated at 16, is provided on the front surface of the selective absorber. Layer 16 can be transparent to radiation in the range of 3 to 40 microns but is preferably transparent to all wavelengths of light incident thereon. One suitable material for the insulating layer 16 is polyethylene.

In a preferred embodiment of the refrigerating device according to this invention the selective absorber preferably consists of a vacuum vaporated reflective aluminum layer covered with a vacuum evaporated layer of silicon monoxide having a thickness in the range of 0.9 micron to 1.5 microns and preferably on the order of 1.2 microns. The term "silicon monoxide" as used in the specification and claims consists of the compositions SiO and $SiO_1+X$. Alternatively other substances containing a silicon-oxygen bond (such as silica, silicones and silicates), or a carbon-fluorine bond (such as polytetrafluorethylene), or a carbon-carbon bond, or a carbon-nitrogen bond, or a carbon-oxygen bond, or a nitrogen-hydrogen bond such as ammonia or its compounds, can be used to give absorption of radiation between 8 and 13 microns.

In a further embodiment of the invention as illustrated in FIG. 2, the layer of poor thermal conductivity which covers the selective absorber is formed of a plurality of air spaces 18 which are preferably free from water vapor and carbon dioxide. Suitable thermal insulators 20 are used to form the columns and support a sheet of insulation 22 which protects the interior of the column from mixing with ambient air. Insulator 22 can be transparent to radiation in the range of 8 to 13 microns but is preferably transparent to all wavelengths incident thereon.

It is to be understood that the insulating layer 16 of FIG. 1, which is in thermal contact with the selective absorber, will be cooled below ambient by conduction and so must not absorb substantial amounts of incident radiation. In FIG. 2 the true insulator is the air space which is transparent in the range below 40 microns. As stated above the purpose of the insulator 22 is to keep the air in the space stagnant. Since insulator 22 is only in "radiant contact" with the selective absorber, it need only be transparent to radiation in the range of 8 to 13 microns. A single column of air may be used where such would be more suitable. Alternative protective insulation means can be a mass of infra-red (8 to 13 microns) transparent material containing pockets of air or other suitably transparent gas.

With the selective absorber mounted horizontally in the open, the heat that it emits is in the far infra-red with the majority of the radiation between wavelengths of 8 and 13 microns. However, in this wavelength range the cloudless atmosphere emits or absorbs very little radiation, while outside this range (due to the presence of water vapor and carbon dioxide) the atmosphere is essentially opaque and emits and absorbs radiation.

Due to the selective properties of the absorber it can only emit or absorb radiation in the range of 8 to 13 microns. Due to the fact that the atmosphere is not emitting at these wavelengths there is very little radiation falling on the selective absorber. The selective absorber thus emits more radiation than it absorbs and so its temperature will fall.

The heating effect of sunlight is minimized by the reflecting surface of the selective absorber because the majority of the energy in sunlight is in the visible, near infra-red and ultra-violet range of wavelengths. The provision of a thin layer of a material such as germanium or silicon, which is opaque to radiation outside the range of 8 to 13 microns, on the outer face of the insulating layer (16 of FIG. 1 and 22 of FIG. 2) further limits heating by solar radiation. This layer will get warm due to the energy it absorbs but being in contact with the outside air it will not get too warm.

A sunshade (indicated at 30 in FIG. 3) of suitable size and shape can also be added so that the surface of the selective absorber is in shade at all hours of the day. For example, a vertical sunshade of sufficient height and width and having its upper portion forming an obtuse angle over the selective absorber surface will provide shade for the absorber surface. This sunshade is preferably mounted so that it is freely movable to permit convenient orientation to the sun. Since the sun is continually moving, suitable automatic means 32 may be provided to permit the shade to be oriented to the sun at all times. The surface of the sunshade presented to the selective absorber should be a good reflector so that it will not emit heat radiation to be absorbed by the selective absorber, and should preferably be placed at such an angle that it reflects the sky into the selective absorber.

The performance of this system can be calculated from the Planck radiation law and measurements of the infrared radiation emitted by the atmosphere. For a cloudless sky, it is found that the net loss of heat by radiation from one square metre of surface (having an emissivity of 0.5) at 0° C. in one day is 1,600,000 calories. This is equivalent to the heat absorbed in melting 20 kilograms of ice. If a lower temperature is desired then less "cooling power" is available, or if a higher temperature is desired then more "cooling power" is available. The lowest temperature which can be reached and at which no "cooling power" is available appears to be about −80° C.

If the sky is covered completely with clouds, the lowest temperature which can be reached is the temperature of the clouds and the amount of heat energy which can be transferred from the selective absorber is limited accordingly. If the rear of the selective absorber is effectively insulated, the active surface will cool to the temperature of the clouds, say, 0° C. If the cloud cover is partial the active surface will cool to a temperature between −80° C. and 0° C., in proportion to the amount of cloud cover. Thus measuring the temperature of the active surface gives a measure of the amount of cloud cover.

From the above performance figures it can be calculated that if the roof 24 of a single storied house 26 is made of active surface then the cooling available should be sufficient to air condition the house. As the source of cold is above the rooms to be cooled, suitable ducting 28 gives automatic circulation of air.

In some cases it would not be necessary for the active surface to cool below 10° C. If this is so, then, besides absorbing between 8 and 13 microns, no harm, and a small amount of good, would come if the active surface also absorbed between 4 and 8 microns. This is because the back radiation from the sky between 4 and 8 microns has an average equivalent temperature of about 5° or 10° C.

If the active surface cools below the dew point of the air, then water will condense. It appears that a square metre of active surface could condense a few pints of water from the air per day. The exact amount depends on the dew point of the air and the efficiency of the heat exchanger through which the warm incoming air and cold dry exhaust air pass. Once again its should be possible to circulate the air automatically by thermal syphon action.

The efficiency of a heat engine depends on the temperature difference available. By using a sink below ambient temperature produced by means of the present invention, the efficiency of heat engines, and particularly of engines operating by means of solar radiation could be raised.

While the invention has been described with respect to particular embodiments thereof wherein the layer of high absorption in the range 8 to 13 microns preferably consists of silicon monoxide, other materials can be used in combination with a reflective surface to form the "selective absorber," the principal requirement being that the layer be transparent to all wavelengths except between 8 and 13 microns where it absorbs strongly. In addition to the materials discussed previously, certain metallic oxides such as zinc oxide are equally suitable.

Since certain changes may be made in the above apparatus and process without departing from the scope of the invention herein involved, it is intended that all matter contained in the above description, or shown in the accompanying drawing, shall be interpreted as illustrative and not in a limiting sense.

What is claimed is:

1. A refrigeration device wherein heat is removed from a surface by selective radiation, said device comprising a heat exchange support arranged in heat exchange relation with a body to be cooled, a highly reflective layer in contact with said support, a layer of a material capable of radiating more energy than it absorbs overlying said reflective layer and a thermal insulating layer external and contiguous to said material.

2. A refrigeration device wherein heat is removed from a surface by selective radiation, said device comprising a heat exchange support arranged in heat exchange relation with a body to be cooled, a vacuum-deposited reflective layer selected from the group consisting of silver, gold and aluminum in contact with said support, a vacuum-deposited layer of a material which emits and absorbs radiation within the range of about 8 to 13 microns and is substantially transparent to radiation outside said range and a thermal insulator in contact with said material.

3. The device of claim 2 wherein said thermal insulator comprises a column of air free from water vapor and carbon dioxide and separated from the atmosphere with a layer of polyethylene said layer of polyethylene being at least transparent to radiation in the range of about 8 to 13 microns.

4. A refrigeration device wherein heat is removed from a surface by selective radiation, said device comprising a heat exchange support arranged in heat exchange relation with a body to be cooled, a reflective surface on said support, a layer comprising a material which absorbs and emits radiation within the range of about 8 to 13 microns and is substantially transparent to radiation outside said range, said layer overlying said surface, and a thermal insulating layer which is substantially transparent to radiation in at least the range of 8 to 13 microns overlying said absorbing layer.

5. The device of claim 4 wherein said thermal insulating layer comprises polyethylene.

6. The device of claim 4 wherein said thermal insulating layer is provided on its outer surface with a layer of material which is transparent to radiation between about 8 and 13 microns and is substantially opaque to radiation below the 8 microns range and is selected from the group consisting of silicon and germanium.

7. A refrigeration device wherein heat is removed from a surface by selective radiation, said device comprising a heat exchange support arranged in heat exchange relation with a body to be cooled, said support being highly reflective on one surface, a vacuum-deposited layer of silicon monoxide overlying said reflective surface and having a thickness in the range of about 0.9 to 1.5 microns which layer emits and absorbs radiation within the range of about 8 to 13 microns and is substantially transparent to radiation outside said range and a thermal insulating layer which is substantially transparent to incident radiation in the range of at least 8 to 13 microns adjacent said selective absorber layer.

8. A refrigeration device wherein heat is removed from a surface by selective radiation, said device comprising a heat exchange support arranged in heat exchange relation with a body to be cooled, said support being highly reflective on one surface, a vacuum-deposited layer of silicon monoxide overlying said reflective surface and having a thickness in the range of about 1.2 microns which layer emits and absorbs radiation within the range of about 8 to 13 microns and is substantially transparent to radiation outside said range and a thermal insulating layer which is substantially transparent to radiation in the range of 8 to 13 microns adjacent said selective absorber layer.

9. The process for producing refrigeration which comprises connecting a selective absorber surface in heat exchange relation to a body to be cooled, transferring heat from said body into said absorber surface, radiating heat from said absorber surface within the range of 8 to 13 microns and pointing said surface toward the sky which has little radiant energy in the range of 8 to 13 microns.

10. The process of claim 9 wherein the absorber surface is shielded from direct sunlight.

11. The process for producing refrigeration which comprises connecting a selective absorber surface in heat exchange relation to a body to be cooled, transferring heat from said body into said absorber surface, radiating heat from said absorber surface within the range of 4 to 13 microns, pointing said surface toward a portion of the sky which has little radiant energy in the range of 4 to 13 microns and shielding said surface from direct sunlight.

12. The process of claim 11 wherein said shielding permits reflection of the sky into said absorber surface.

13. The process for producing refrigeration which comprises connecting a selective absorber surface in heat exchange relation to a body to be cooled, transferring heat from said body into said absorber surface, radiating heat from said absorber surface within the range of 8 to 13 microns, pointing said surface toward the sky which has little radiant energy in the range of 8 to 13 microns, shielding said surface from contact with ambient air by providing an insulator on said surface, said insulator being substantially transparent to radiant energy in the range of 8 to 13 microns.

14. A selective absorber comprising a reflective surface and a material on said surface comprising a substance which absorbs and emits radiation within the wavelength range of 8 to 13 microns and is transparent to radiation outside said range, said selective absorber being capable of radiating more energy than it absorbs.

15. A refrigeration device for cooling a building which comprises a heat exchange support arranged in heat exchange relation with a building to be cooled, a reflective surface on said support, a layer comprising a material which absorbs and emits radiation within the range of about 4 to 13 microns and is substantially transparent to radiation outside said range, said layer overlying said surface, and a thermal insulating layer which is substantially transparent to radiation in the range of about 4 to 13 microns overlying said layer, and means for transferring heat from said building to said support.

References Cited in the file of this patent

UNITED STATES PATENTS

| | | |
|---|---|---|
| 2,289,809 | Sherwood | July 14, 1942 |
| 2,428,876 | Hawkins | Oct. 14, 1947 |
| 2,484,127 | Stelzer | Oct. 11, 1949 |
| 2,668,364 | Colton | Feb. 9, 1954 |
| 2,671,441 | Harris | Mar. 9, 1954 |
| 2,705,948 | Rostock | Apr. 12, 1955 |
| 2,888,007 | Tabor | May 26, 1959 |
| 2,918,709 | Corcoran | Dec. 29, 1959 |

FOREIGN PATENTS

| | | |
|---|---|---|
| 60,391 | Norway | Jan. 30, 1939 |
| 216,056 | Australia | July 11, 1958 |